Sept. 16, 1969 P. A. HARDING 3,467,953

DRIVE CURRENT OPTIMIZATION FOR MAGNETIC MEMORY SYSTEMS

Filed July 12, 1963 9 Sheets-Sheet 1

INVENTOR
P. A. HARDING
BY
Charles Scott Phelan
ATTORNEY

Sept. 16, 1969 P. A. HARDING 3,467,953

DRIVE CURRENT OPTIMIZATION FOR MAGNETIC MEMORY SYSTEMS

Filed July 12, 1963 9 Sheets-Sheet 3

INHIBIT DRIVER

Sept. 16, 1969 P. A. HARDING 3,467,953

DRIVE CURRENT OPTIMIZATION FOR MAGNETIC MEMORY SYSTEMS

Filed July 12, 1963 9 Sheets-Sheet 5

DRIVE CURRENT OPTIMIZATION FOR MAGNETIC MEMORY SYSTEMS

Filed July 12, 1963

Sept. 16, 1969 P. A. HARDING 3,467,953

DRIVE CURRENT OPTIMIZATION FOR MAGNETIC MEMORY SYSTEMS

Filed July 12, 1963 9 Sheets-Sheet 9

3,467,953
DRIVE CURRENT OPTIMIZATION FOR MAGNETIC MEMORY SYSTEMS

Philip A. Harding, Middletown, N.J., assignor to Bell Telephone Laboratories, Incorporated, New York, N.Y., a corporation of New York Filed July 12, 1963, Ser. No. 294,506
Int. Cl. G11b 5/00
U.S. Cl. 340—174 19 Claims

ABSTRACT OF THE DISCLOSURE

Noise voltages in magnetic memory sensing circuits are reduced by determining the amount of noise in one sensing circuit and then adjusting the output current magnitude of at least one of the memory drive signal sources to minimize the noise. In one arrangement the noise signals are displayed on an oscilloscope and one or more drive sources are manually adjusted. In another, a single inhibit driver common to all digit planes is automatically adjusted by servo loop circuits. A sensing circuit discrimiinator and a ZERO location decoder for use in the latter arrangement are also shown.

This invention relates to a method and apparatus for optimizing the drive current magnitudes in a magnetic memory system.

It is well known that magnetic memory systems are plagued by noise voltages which appear in the sensing circuits thereof. In certain memories these noise voltages may attain sufficient magnitude to mask completely the desired read-out signal therefrom. A large portion of the noise signals may be attributed either directly or indirectly to the fact that such memories include bistable magnetic devices which theoretically have rectangular hysteresis characteristics defining the two stable states of remanent flux which represent the binary ONE and ZERO storage conditions for binary coded information. However, it is a well-know fact in the art that such bistable devices have hystersis characteristics which are in fact not truly rectangular.

The lack of perfected rectanguarity in magnetic devices of the type just described produces well-known spurious effects in coincident current magnetic memory systems. In such systems coincident half-select currents are applied along intersecting rectangular coordinates to select for operation a magnetic device located at the coordinate intersection. However, many devices at other locations along the selected coordinates receive only a single half-select current at any one time and develop in the corresponding memory sensing circuits noise voltages which result from partial switching of the half-selected devices. The partial switching takes place because the nonrectangularity of the device characteristics permits the device to operate on a minor hysteresis loop within its major loop in response to the half-select signals as is well known in the art.

The memory wiring topology is arranged to make half of the noise pulses generated in any one sense circuit positive and half negative thereby tending to cancel the noise effects in the sense circuit. However, the net noise magnitude in such a circuit is a function of the exact flux density states of the devices activated. Since the exact flux density state is a function of both the information content and the immediate past half-select history of the device, the half-select noise pulses generated at any one device are not of the same magnitude as similar pulses generated at each other device along the same sense circuit of the memory. Consequently, imperfect noise cancellation results. The net noise resulting from such imperfect noise cancellation tends to mask the desired read-out signal from the sensing circuit as previously mentioned.

Many schemes have been devised for reducing the noise voltage effects in a magnetic memory sensing circuit. Such schemes are at least partially successful when used singly or, sometimes, in combination. However, no single scheme, or combination of schemes, have been able to conquer completely the noise voltage problem which is due to nonrectangular hysteresis characteristics that are supposed to be rectangular.

It is therefore an object of the present invention to reduce the sensing circuit noise in a magnetic memory in a fashion which is useful with any one or more, or with none, of the other known noise reduction schemes.

This object, as well as others which will be apparent from a perusal of the description herein, is realized in accordance with the present invention in a magnetic memory which employs a plurality of drive circuits for interrogating bistable magnetic devices comprising the matrix storage array in the memory, and for writing information into such devices. Sensing circuits are electromagnetically coupled to different groups of the devices in the memory array for coupling read-out signals generated at different memory locations to external utilization means. In accordance with the invention, noise voltages in the sensing circuits are considerably reduced by the basic steps of determining the amount of noise in a sensing circuit and adjusting the output current magnitude of one memory drive force to obtain a minimum noise level in the memory sensing circuit. Apparatus for carrying out these steps either manually or automatically by electronic circuit means are presented herein.

It is one feature of the invention that the output current magnitude of a memory drive current source is adjusted to produce an output current level which has a determinable relationship to memory output noise. Each memory device linked by a circuit carrying such adjusted drive current is biased by that current to a magnetic flux density level such that the application to such biased devices of the next drive signal of half-select amplitude causes each such biased device to induce in its sensing circuit a noise voltage of substantially the same predetermined magnitude as the noise voltage induced in such circuit by all other biased devices coupled thereto. This condition thereby facilitates the functioning of half-select noise cancellation schemes which are known in the art.

It is another feature of the invention that the principles thereof are advantageously systematically extendable to find an optimum combination of drive current magnitudes which will produce the maximum sensing circuit signal-to-noise ratio.

Still another feature of the invention is that the method steps thereof are advantageously incorporated into a novel servo loop connection which automatically detects departures from an optimum drive current combination and readjusts one drive current amplitude to obtain a new optimum level with minimum sensing circuit noise.

Yet another feature of the invention is that in a magnetic memory system with predetermined digit planes, an extra digit plane is added and has stored therein a theoretical worst noise pattern. The current in any one of the drive circuits is adjusted to obtain a minimum noise level from the extra digit plane in order to maintain the drive current parameters for the memory system at an optimum combination of levels for the worst noise conditions anticipated in the memory.

A further feature of the invention is a unique load driving arrangement for word-oriented memories in which a separate write-in drive circuit is utilized for each of the sensing circuit device groups. This load driving arrangement makes it possible to drive in series from a single drive signal generator all of such write-in drive circuits which are required for word write-in so that currents in all such circuits are simultaneously controllable and drive current optimization is thereby facilitated.

The salient features of the invention are delineated with particularity in the appended claims. However, a complete understanding of the underlying principles of the invention and the various objects and features thereof may be obtained from the following detailed description when taken in connection with the attached drawing in which:

FIG. 1 is a schematic block and line diagram of a magnetic memory system utilizing apparatus for carrying out the method steps of the invention;

FIGS. 2A through F are current-versus-time diagrams illustrating operation of the invention;

FIGS. 3A through C are noise voltage diagrams illustrating the operation of the invention;

FIG. 4 presents hysteresis diagrams of a typical bistable magnetic device which are presented to illustrate the operation of such device in accordance with the invention;

Figure 1:
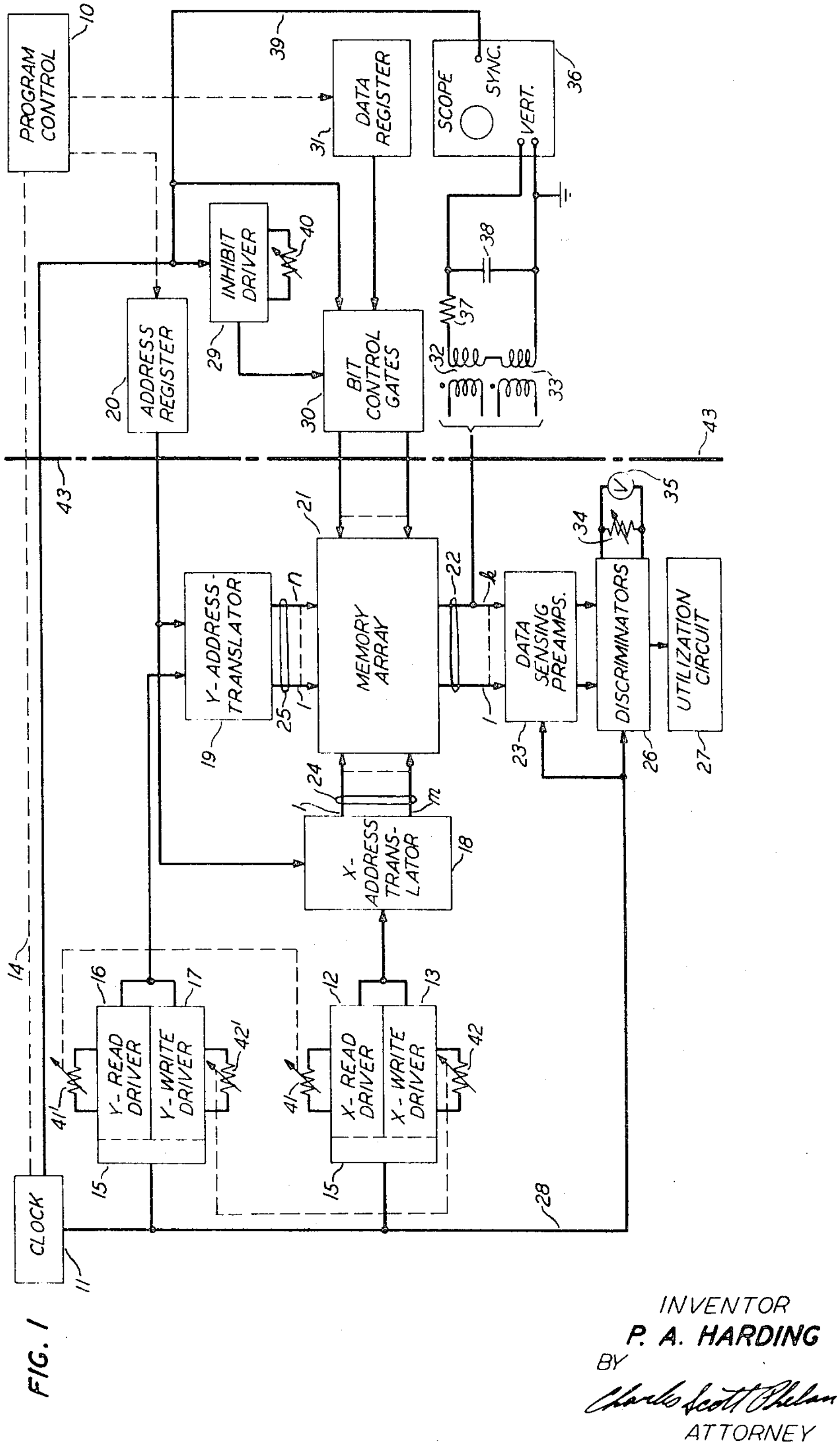

The coincident current magnetic memory system illustrated in FIG. 1 is advantageously employed as part of a program-controlled system such as an electronic switching system that may be employed in a telephone central office. In FIG. 1 a program control apparatus 10 is indicated as providing the central control for the system and for the portions thereof illustrated in the drawing. A source 11 of clock signals is operated in synchronism with program control 10 as schematically indicated by the broken line 14 between source 11 and program control 10. Source 11 provides output control pulses at appropriate timing phases for actuating X and Y read and write drivers 12, 13, 16, and 17. The clock pulses are coupled to the drivers through predisturb logic 15 as will subsequently be described. These drivers are advantageously of the type illustrated in the P. A. Harding and E. H. Siegel, Jr., Patent No. 3,275,840 which issued September 27, 1966, and is assigned to the same assignee as the present application. As indicated in such application, the read and write drivers are interrelated and are coupled to the same drive circuits. Therefore, the drivers 12 and 13 are together a single driver for the X coordinate of the memory and the drivers 16 and 17 are a single driver for the Y coordinate of the memory.

These X and Y drivers supply drive current pulses to X and Y address translating and access circuits 18 and 19 which are of the type illustrated in the C. G. Corbella, P. A. Harding, and E. H. Siegel, Jr., Patent No. 3,205,481 which issued Sept. 7, 1965, and is assigned to the same assignee as the present application. The latter circuits are controlled by an address register 20 which is operated under the supervision of program control apparatus 10 in conjunction with other apparatus in the program controlled system in order to direct the current driver pulses along appropriate X and Y coordinate circuits within a magnetic memory array 21 in order to select a certain group of devices therein for actuation. This operation is assumed to be carried out in connection with a word-oriented, or three-dimensional, coincident current memory system which has three orthogonal coordinates for defining memory addresses. The X and Y circuits comprise two of the orthogonal coordinate circuits and the inhibit circuits, to be described, comprise the third. The array 21 is advantageously a plurality of apertured sheets of ferromagnetic material, each of which sheets comprises plural bistable storage devices.

During interrogation functions of the memory system, output pulses from the X and Y read drivers 12 and 16 are coupled to memory array 21 to actuate selected devices therein; and corresponding signals are generated by the switching of certain ones of those devices in a manner which is known in the art to produce output signals on sensing circuits 22 of the memory to indicate for each bit of the selected memory word whether the bit stored in the memory was a binary ONE or a binary ZERO. The sensing circuits 22 are applied to the input connections of data sensing preamplifiers 23 in order to amplify the signals induced in the sensing circuits to an appropriate level for amplitude detection.

It will be noted in the drawing that in this particular embodiment the X drive circuits 24, the Y drive circuits 25, and sensing circuits 22 are not equal in number, there being $m$ circuits 24, $n$ circuits 25, and $k$ circuits 22. Thus $m \cdot n$ $k$-bit words can be stored in the memory array. Of course, $m$ and $n$ can be made equal to one another and to $k$ if desired.

The outputs of the sensing preamplifiers 23 are coupled by discriminators 26 to a suitable utilization circuit 27. Preamplifiers 23 and discriminators 26 are advantageously actuated by clock signals applied on a circuit 28 for sampling the output signals of the preamplifiers 23 at a predetermined time interval during each data bit interval of the read-out. One such combination of preamplifier and discriminator is shown and claimed in the copending application Ser. No. 253,227, filed Jan. 22, 1963, in the names of R. M. Genke and P. A. Harding and now Patent No. 3,308,388.

In order to write information into the selected word location of the memory, clock signals from source 11 are applied to actuate an inhibit driver 29 which controls a plurality of data bit control gates 30 for coupling bit information signals from a data register 31 to the various digit planes of the memory for cooperating with the X and Y drive signals to write into array 21 a desired word received from control apparatus 10 by register 31. Gates 30 are arranged in accordance with the invention to enable the single driver 29 to drive simultaneously in a series connection all of the inhibit circuits required for writing in the desired word. The arrangement and operation of driver 29 and gates 30 are hereinafter described in connection with FIGS. 5, 6, 6A, and 6B.

Further in accordance with the present invention, the magnitude of the output current from one of the memory system drivers is advantageously adjusted to an optimum level in order to produce a minimum of noise in sensing circuits 22. The basic steps of the optimizing method for accomplishing that function may be considered in connection with the additional apparatus shown in FIG. 1. Thus, one of the sensing circuits 22, for example, the circuit $k$ in that group, has two portions thereof coupled by means of transformers 32 and 33 to the vertical deflection input terminals of an oscilloscope 36. A two-transformer connection is utilized for equalization purposes so that a pulse generated at any place along the $k$ plane sensing circuit has substantially the same shape as similar pulse generated at all other locations along the circuit. The manner of connecting two sensing circuit portions to an output connection through two transformers is indicated schematically in FIG. 1, but it is shown in detail and claimed in the copending application of P. A. Harding and E. H. Siegel, Jr., which is designated application Ser. No. 250,559, filed Jan. 10, 1963, and now Patent No. 3,339,187. Transformers 32 and 33 are advantageously separate from similar transformers utilized for driving the data sensing preamplifier for circuit *k*, but a single pair of transformers can be used for both purposes. The secondary windings of transformers 32 and 33 are connected in series through a resistor 37 to the vertical deflection input terminals of the oscilloscope 36. A capacitor 38 is connected across those vertical input terminals. Resistor 37 and capacitor 38 comprise a low-pass filter for attenuating very high frequency noise appearing in sense circuits 22 during transient voltage portions of drive signals applied to memory array 21 as is well known in the art. The horizontal sweep generator in the oscilloscope 36 is triggered by a clock pulse applied from source 11 by means of a circuit 39 which is coupled to the synchronizing input of the oscilloscope.

It will at once occur to the reader that in a coincident current magnetic memory the noise which is of interest occurs in the sensing circuit during the read-out interval in the read-write cycle of the memory system. It will also be recalled that in most three-dimensional, coincident current, or word-oriented memory systems the sensing circuit links a relatively few bistable magnetic memory devices in common with any given pair of the selected X and Y drive circuits 24 and 25. However, that same single sensing circuit links a relatively large number of bistable magnetic memory devices in common with the inhibit circuit for the same digit plane. Thus, the noise generated in the sensing circuit in response to an inhibit signal is of a much larger magnitude than the noise generated in such circuit by interrogation signals from X and Y drive circuits. Furthermore, it has been found that when drive current amplitude adjustments are made, the sensing circuit noise due to inhibit drive signals responds in the same manner as the sensing circuit noise due to interrogation signals from the X and Y drivers. However, the noise due to the inhibit signals is considerably more sensitive to the aforementioned adjustments because the noise is larger and is generated at considerably more memory locations for any one inhibit signal. Consequently, it is advantageous to observe the noise which occurs in response to either the rise time or the fall time of the inhibit driver output pulses. In the illustrative embodiment of FIG. 1 it is assumed that the circuit 39 actuates the horizontal sweep generator in oscilloscope 36 in response to the same clock pulse that initiates the read-out interval. The scope sweep starts at the beginning of a read-write cycle and persists for at least the duration of the cycle so that the full memory cycle is displayed on the screen.

Figure 5:
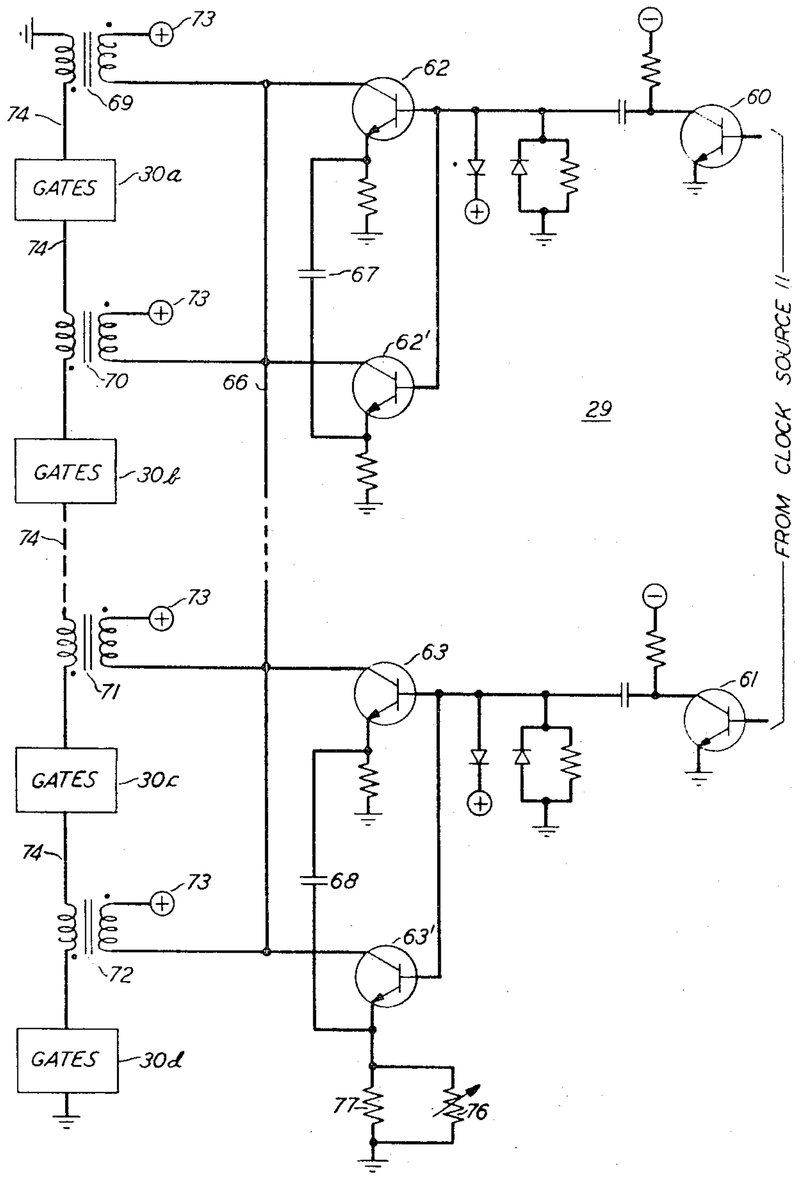
FIG. 5 is a simplified schematic diagram of an inhibit driver that is advantageously employed in the system of FIG. 1.

In the embodiment of FIG. 1 the output current magnitude of the inhibit driver 29 is advantageously adjusted by means of a variable resistor 40 which is connected thereto in order to indicate the current magnitude adjustment schematically. The driver 29 is advantageously of the general type disclosed in the previously mentioned Harding et al. Patent No. 3,275,840, but driver 29 employs only half of the full driver because it is necessary to produce output pulses of only one polarity. The relevant portion of this driver, with current adjusting means, is shown in FIG. 5 of the present application. Although the invention will be described in terms of adjustments of the inhibit driver, it is to be understood that substantially the same beneficial results which will be described are also produced by accomplishing adjustments in a similar manner of either the read drive currents or the write drive currents. Adjusting resistors 41 and 42 are indicated on X drivers 12 and 13 for adjusting read and write drive currents, respectively. Similarly, adjustable resistors 41' and 42' are associated with the Y drivers and ganged for operation with resistors 41 and 42, respectively, so that corresponding X and Y drive currents track one another.

Figures 2A, 2B, 2C, 2D, 2E, 2F:
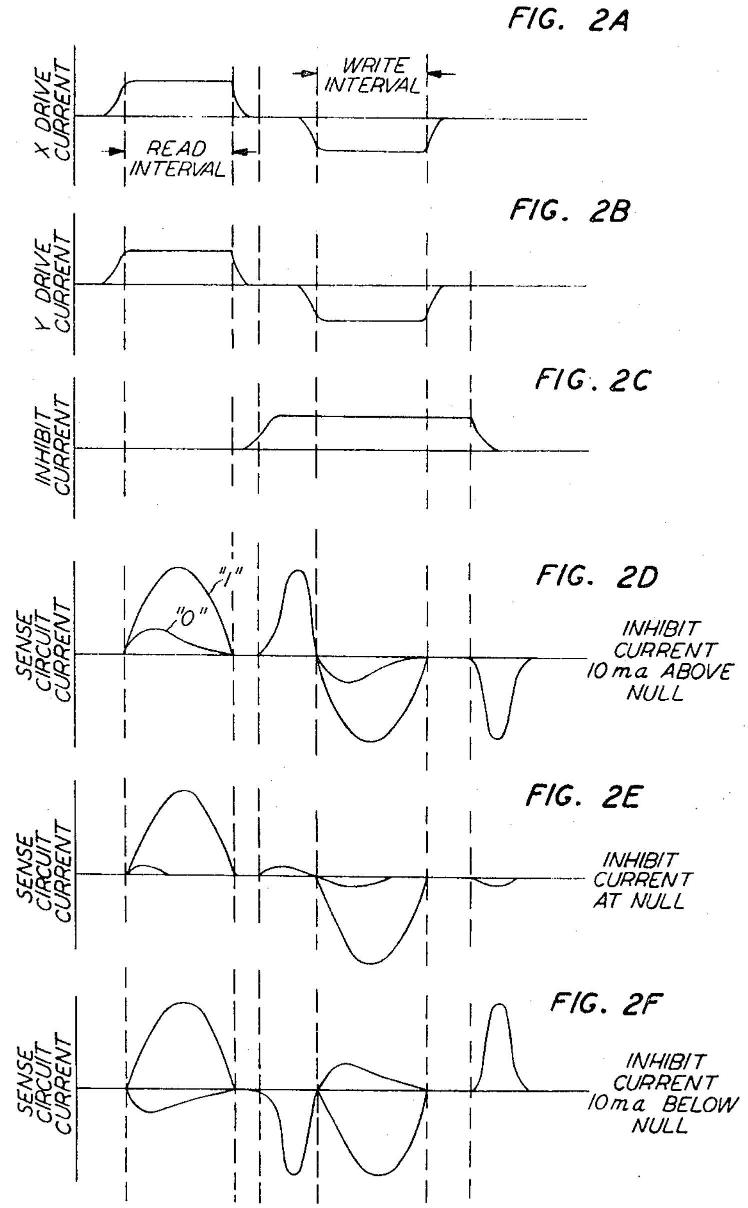

Oscilloscope 36 produces on the screen thereof traces of superimposed signals in the *k* sensing circuit 22 resulting from successive read-write cycles of the memory. Such traces are illustrated in FIGS. 2D, 2E and 2F for different inhibit current levels. These traces are presented on a common time scale with X, Y, and inhibit drive currents in FIGS. 2A, 2B, and 2C to facilitate association of the sensing circuit signal characteristics with memory drive functions. All of the traces in FIGS. 2A–F represent conditions in a memory digit plane storing a theoretical worst noise pattern in which all positive holes of an apertured sheet are ONE and all negative holes are ZERO.

In FIG. 2D, it is seen that the superimposed ONE and ZERO signals in the sensing circuit are positive during the read interval and negative during the write interval, and the sense circuit signals for those two intervals are followed by narrow pulses of the same polarity as the ZERO signals corresponding to the inhibit drive signal transitions. As is well known in the art, the ZERO pulses and the inhibit transaction pulses in the sensing circuit are really noise because they are produced by partial flux switching in magnetic devices without sufficient flux being switched to change the state of the device from that representing one binary condition to that representing the other binary condition. In accordance with the present invention it is found that the magnitude of such noise indicated by, and observed in, the traces on oscilloscope 36 may be increased or decreased by appropriate adjustment of any one of the read, write, or inhibit drive currents.

In FIG. 1 the inhibit drive current is advantageously adjusted in order to accomplish the noise magnitude varying function. It has been found further that there is a range of drive current in which a minimum amount of noise is produced. This is indicated on the scope by noise traces of minimum amplitude. FIG. 2D represents the condition in which the inhibit current is 10 milliamperes above the minimum, or null, noise condition. FIG. 2E illustrates the null condition at which the noise traces of ZERO and inhibit transition pulses have almost completely disappeared. FIG. 2F illustrates the condition in which inhibit current is 10 milliamperes below the level producing minimum noise. An interesting fact appears from comparison of FIGS. 2D and F, namely the noise in FIG. 2F is of opposite polarity from that in FIG. 2D; but the information, or ONE, traces are essentially unchanged.

Figure 3A:
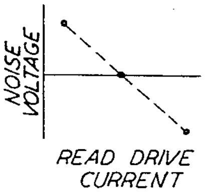
Figure 3B:
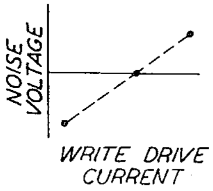
Figure 3C:
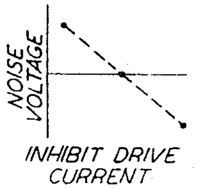

The noise null and polarity reversal are further represented by the noise-versus-current diagrams of FIGS. 3A, 3B, and 3C for read, write, and inhibit drive currents, respectively. These diagrams also represent the same worst noise pattern utilized for FIGS. 2A–F. The diagrams of FIGS. 3A–C each include the three conditions represented in FIGS. 2D–F in which drive current is at null and 10 milliamperes below and above noise null. For low read and inhibit currents the noise is positive, for the high currents it is negative, and at an intermediate current level the noise is of essentially zero magnitude. The write current diagram of FIG. 3B is of opposite slope but otherwise similar in the nulling effect produced. The broken lines in the diagrams of FIGS. 3A–C indicate in generalized form a characteristic including the high, null, and low points without depicting the exact nature or other aspects of the characteristic.

It has been shown in connection with FIGS. 3A–C that each drive current can be varied to produce a noise null in a sensing circuit. It has furthermore been found that there is what might be called an "optimum optimum condition." That is, there is a certain combination of drive current parameters for a given memory system which produces the largest signal-to-noise ratio in the memory output sensing circuits as well as producing a minimum noise level. This optimum optimum can be found in a systematic manner by first adjusting the inhibit driver 29 to produce a noise null in a manner previously described. Next, the signal-to-noise ratio is determined as the smallest ONE signal divided by the largest ZERO signal. The smallest ONE signal is the maximum discriminator threshold circuit of the discriminator. The largest ZERO signal is measured by the minimum threshold voltage that will still block the passage of a ZERO signal through the discriminator. A resistor 34 is shown in FIG. 1 to illustrate schematically the threshold adjustment, and a voltmeter 35 is connected to resistor 34 for indicating voltages consituting the signal-to-noise ratio.

The second step in finding an optimum optimum drive current combination is to select a new value of read current by adjusting resistors 41 and 41' on the read drivers 12 and 16. A new optimum inhibit current is determined, and the new signal-to-noise ratio is also obtained. By repeating the operation of other values of read current it will be found that there is an optimum value of read drive current and a corresponding inhibit current, still with the same write current, which produces a maximum signal-to-noise ratio. This new maximum ratio will, barring coincidence, be larger than that obtained by the initial inhibit drive adjustment.

Next, utilizing the optimum read drive current just determined, the same procedure is repeated, this time adjusting the write driver outputs by means of the resistors 42 and 42', to separate write current values in successive steps. At each step the inhibit current is adjusted to null the noise for each write current, until an optimum value of write drive current for the previously determined optimum read drive current is found at which a maximum signal-to-noise ratio results. This same step is repeated, using all of the same write current values for each of the other read drives previously tried; and there is obtained a combination of read and write drive currents and an optimum inhibit current which produces a maximum signal-to-noise ratio. Under these conditions, the memory system is set at its optimum optimum. That is, the sensing circuit noise is nulled at a combination of drive current magnitudes which produces the maximum possible signal-to-noise ratio.

Figure 4:
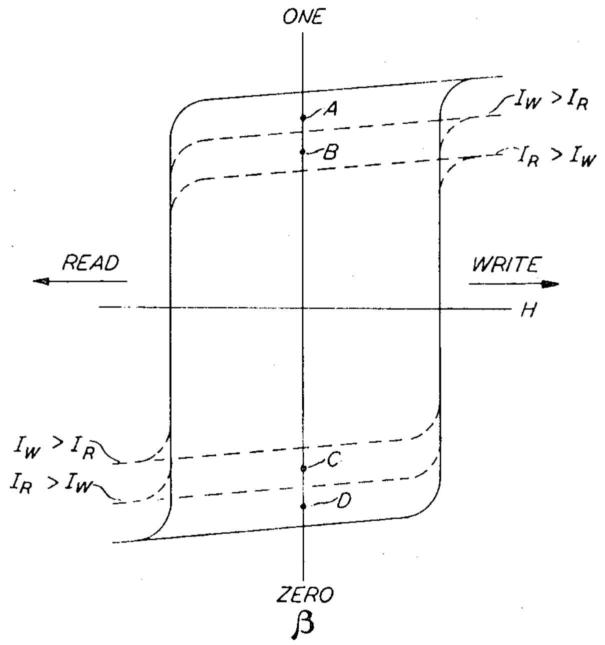

Turning now to FIG. 4, a brief explanation will be ventured as to the reason why it is possible to adjust a drive current for a magnetic memory system to obtain a null or minimum value for noise in the sensing circuit. FIG. 4 includes in solid-line form a typical hysteresis characteristic of a bistable magnetic device, such as that defined by the ferromagnetic material around a hole in an apertured ferrite sheet. This is the type of device that is advantageously employed in the memory array 21 in FIG. 1. Also included in FIG. 4 are two broken-line, biased, hysteresis characteristics. Positively oriented flux is considered a binary ONE and negatively oriented flux a ZERO. The solid-line characteristic is herein assumed to represent the extreme operating conditions to which the device could be driven by the application of a sufficiently intense magnetomotive force for a sufficient time. However, in practical systems the device is not usually so operated because lesser forces and shorter times can accomplish sufficient stable flux switching. Practical devices are generally operated in subloops, or characteristics, of smaller extent. The broken-line loops $I_W > I_R$ and $I_R > I_W$ are two such practical loops. The particular significance of these latter two loops will become apparent as the discussion proceeds.

The hysteresis curves in FIG. 4 represent the type of characteristic which is commonly called a "rectangular" hysteresis characteristic. However, as a practical matter the characteristic is not exactly rectangular, and a good many of the magnetic memory noise problems result from the departures from rectangularity in the characteristics of practical bistable magnetic devices. It is known that in each of the two stable flux density conditions, the device may actually have a larger or smaller remanent magnetic flux density under different conditions. Thus, a binary ONE may be represented by a device which rests in the positively oriented flux density condition, at either of the points A or B indicated therein, or at any number of additional flux density points in the same vicinity. Similarly, a binary ZERO may be represented by either one of the flux density states represented by the points C and D in FIG. 4, or at a large number of other points in the same general area.

Normally, a read-out operation in a magnetic memory system will cause to be applied to each interrogated magnetic device a magnetomotive force of more than sufficient intensity to switch the device to the D conditions. Similarly, if it is desired to write a ONE in the same device, an oppositely poled magnetomotive force is applied and switches the device to the A condition. However, any coordinate drive circuit links a plurality of other magnetic devices in addition to the one selected by the intersection of the X and Y drive circuits actuated during a read or write operation. These other devices have applied thereto a magnetomotive force which has a half-select magnitude. The half-select read signals tend to drive the device in a minor hysteresis loop to bias binary ONES to the B state and binary ZEROS to the D state as is well known. However, at any particular instant there is an uncertainty in a memory as to the particular remanent flux density condition in which any particular device resides. This results from the unpredictable half-select history of each such device. It is at this stage that the lack of rectangularity in a bistable magnetic device comes into play.

Thus, a device storing a binary ONE, which resides at the A state, would on receiving a half-select read signal have a small portion of the flux therein switched and be thereby reduced to the B flux density state. However, in so doing, a small signal is induced in the sensing circuit linking the device. Similarly, a device which is already at the B state, and which receives a read half-select signal, has a small amount of flux switched, but this flux then relaxes to restore the device to the B state. Nevertheless, during the operation a small signal is induced in the sensing circuit. A similar condition prevails for the C and D flux density conditions in FIG. 4. In one particular bistable magnetic device not utilizing the present invention it was found that the application of a read half-select signal to the device when it rested successively in the A, B, C, and D conditions, caused the device to produce in the sensing circuit noise voltages of 8, 5, 7 and 4 millivolts, respectively.

In many magnetic memory systems, the presence of these half-select noise voltages is recognized and the interrogation and sensing circuits are differently oriented in different parts of the memory array in order to cancel these noise voltages, at least partially, one against the other. However, because of the different voltage magnitudes resulting from devices resting in different ones of the various flux density conditions, the cancellations are imperfect. Even if the memory is predisturbed to put all ONES at B and all ZEROS at D, there is still no equality of induced half-select noise voltages because the ONE and ZERO noise voltages are still at least one millivolt apart in the previously stated example.

In accordance with the present invention, it has been found that by optimizing the drive current magnitudes in the manner previously described herein, a magnetic bias is advantageously applied to the devices. This bias tends to equalize the noise voltages in the sensing circuits for the various flux density conditions which may prevail. By unbalancing the drive currents to produce an optimum combination of drive current magnitudes, a magnetic bias condition is produced which can roughly be said to approximate a hysteresis characteristic which is unsymmetrical with respect to the magnetic field intensity axis thereof. Such a condition is indicated by the broken-line characteristics in FIG. 4 and results in new remanent flux density conditions for the device.

The biased characteristic $I_W > I_R$ results from optimizing the write current to a final value which is somewhat more than the normal half-select magnitude so that the write current is larger than the read current. This results in new stable flux density conditions for the device. It has been found for the biased $I_W > I_R$ characteristic that the half-select noise voltages produced by devices storing a ONE are approximately equal to those produced by devices storing a ZERO. This results from the fact that the nature of a magnetic device with a hysteresis characteristic is such that the harder the device is driven into saturation, the higher is the remanent flux density for the device and the higher is the energy that must be expended in order to bring the device out of the remanent flux density condition once more. Thus, for the $I_W > I_R$ characteristic a larger write current is required to place the device in the ONE condition than would be required for a similar balanced characteristic. However, if no change is made in the read current drive amplitude the same read half-select pulses are able to switch less flux in the device and induces a smaller noise voltage at ONE devices. At ZERO devices, which in the biased state rest at a lower flux density magnitude than do ONE devices, the same read half-select pulses induce a larger noise voltage in the sense circuit. The drive current optimization procedure described herein is adapted to determine the extent of bias needed to substantially equalize the magnitudes of the noises generated by devices storing binary ONE and ZERO bits.

Of course, adjustment of magnetic bias on a device compensates for noise voltage differences that are due to differences in information content of the memory devices. Half-select signals may still disturb the precise flux density condition of a device as previously noted and thereby inject noise pulse differentials. To remove this effect of recent half-select history, predisturb system logic 15 is employed in FIG. 1 for operating the drivers in response to clock pulses. Such a predisturb arrangement is disclosed and claimed in the R. M. Genke, R. W. Ketchledge, and R. E. Sager Patent No. 3,295,116 which issued Dec. 27, 1966. The operation of a predisturb system in conjunction with the optimizing arrangement of the present invention is such that just prior to a read-out interval all devices are disturbed to certain ONE and ZERO flux density conditions of a biased characteristic; and in these two conditions the half-select noise voltage outputs to the sensing circuit from ONE and ZERO devices are substantially identical. Consequently, the noise cancellation schemes used in a memory are more advantageously employed because the cancellations are more perfectly performed.

Optimization by increasing write current has just been described in connection with FIG. 4. In the same initial situation, similar beneficial results in terms of balancing half-select noise voltages are produced if the optimization condition is produced by reducing the read current, for example, instead of increasing the write current. In other systems the best results may be attained by increasing the read current, or decreasing write current; and this is indicated by the broke-line characteristic $I_R > I_W$ in FIG. 4. The best approach will be achieved automatically when the optimum optimum is sought as has been previously described. Also, with respect to an inhibit current source, if an inhibit current is changed as described in connection with FIG. 1 so that it is no longer at the half-select magnitude, any devices which receive the new inhibit current signal are driven to flux density conditions that are larger or smaller than their normal balanced flux density conditions so that the resulting read-out noises at locations storing ONE and ZERO bits are more nearly the same; and noise cancellations proceeds in a more complete fashion. Thus, the drive current optimization of the invention is accomplished by imposing a magnetic bias as a result of adjusting the magnitude of one or more of the drive currents.

It will be recalled that in connection with FIG. 1 it was noted that the inhibit driver 29 and the bit control gates 30 were arranged so that the individual digit plane inhibit circuits 1 through *k* in memory array 21, which are to receive the inhibit signal during any single bit interval, may be driven in a single series circuit. It was also previously noted that the inhibit driver 29 is of a type which is shown in the Harding et al. Patent 3,275,840. Pertinent details of this type of current driver are also shown in FIG. 5 herein as applied to inhibit driver 29. Two input transistors 60 and 61 are connected for driving, respectively, two pairs of transistors 62 and 62', and 63 and 63'. Transistors 60 and 61 receive input signals simultaneously through input logic from clock source 11.

The collector electrodes of all of the transistors of the transistor pairs just mentioned are connected together by a lead 66, as indicated in the Harding et al. Patent 3,275,840, and the emitter electrodes of the transistors in each pair are connected together by two capacitors 67 and 68. Although two pairs of transistors are shown in FIG. 5, additional pairs may be provided as required, as indicated by the broken-line portion of lead 66. Output transformers 69, 70, 71, and 72 are provided as a part of the inhibit driver and the primary winding of each transformer is connected between the lead 66 and a source 73 of positive potential, which is indicated schematically by a circled plus sign representing a source with its negative terminal connected to ground. The secondary windings of the transformers 69 through 72 are interconnected in a single series current loop path 74 with the groups 30*a*, 30*b*, 30*c*, and 30*d* of the bit control gates 30. The groups of the control gates 30 are interspersed between the transformer secondary windings so that the potential drop across each group of gates is approximately equal to the potential rise across the secondary winding of one of the two transformers between which it is connected. With this arrangement, the total operating potential required to drive a current through the series loop circuit 74 is subdivided and applied to the loop at different points so that only a relatively small part of the driving potential appears across any part of the loop circuit elements.

The arrangement whereby drive potential is subdivided for application has at least two principal benefits. One benefit is that the total potential difference can be held to a sufficiently low level that there is no danger of damaging circuit elements as a result of voltage breakdown. A second benefit, however, results from the fact that the lower potentials at each point in the loop circuit 74 are much less affected by the numerous stray capacities in the complex wiring of a magnetic memory system so that there is less shunting of drive energy to the detriment of inhibit circuit operation.

The two principal benefits just mentioned for the inhibit driver arrangement of FIG. 5 are, of course, in addition to the circuit feature which is basically required for a practical current optimization system of the type herein presented. Thus, although the transistors 60 and 61 are separately shown in FIG. 5, they receive input signals at their respective base electrodes from a common signal source, source 11 in FIG. 1, as indicated hereinbefore. Thus, the transistors 62, 62', 63 and 63' all of which have their collector electrodes connected together, comprise with transistors 60 and 61 and the transformers 69 through 72 a single source of inhibit current pulses. Each of the transistors 62, 62', 63, and 63' has its own individual emitter circuit resistance, but the transistor 63' includes in addition an adjustable resistor 76 which shunts the fixed resistor 77 in the emitter circuit of transistor 63'. Resistor 76 corresponds to the resistor 40 in FIG. 1. Adjustment of resistor 76 changes the amount of current which can be conducted by that transistor and thus alters the amount of current which is supplied from source 73 to the collector circuit lead 66. As indicated in the Harding et al. Patent 3,275,840, the inhibit circuit connections shown distribute the output energy of the driver equally among the transformers 69 through 72 automatically as the resistor 76 is varied. Consequently, by changing that one resistor, the inhibit driver current supplied to all of the bit control gates 30 can be changed in the same fashion so that all of the gates receive the same current and their respective loads also receive the same current.

Figure 6:
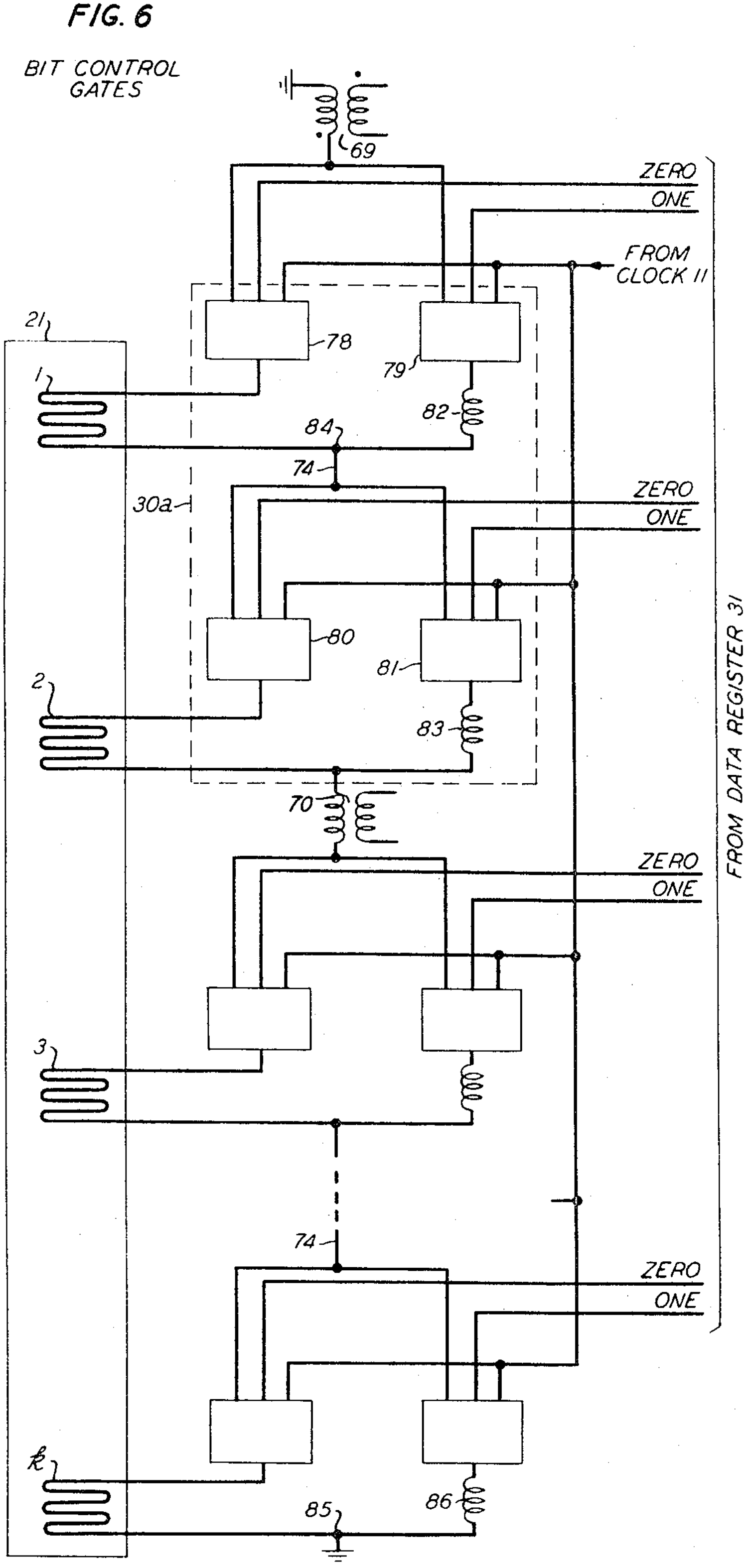
FIGS. 6 and 6A depict in simplified form an arrangement for bit control gates utilized in the system of FIG. 1.

In FIG. 6 the details of a group of the bit control gates 30 are shown in order to illustrate the manner of their operation in conjunction with the inhibit driver 29, clock 11, and data register 31, which are shown in FIG. 1. The group 30*a* of bit control gates includes four pulses AND gates 78, 79, 80, and 81, arranged in the pairs 78, 79 and 80, 81. Each of the gates has an input connection from the clock pulse source 11 and also has an input connection in the aforementioned series loop circuit 74. Gates 78 and 79 have further inputs from data ZERO and ONE output connections, respectively, of the data register 31 for the 1 bit plane of the memory array 21.

Connected in series with the output of the gate 78 in FIG. 6 is the inhibit circuit for the 1 bit plane, and connected in series in the output of gate 79 is a coil 82 which has impedance characteristics that substantially duplicate those of the 1 bit plane inhibit circuit. In a similar fashion, gates 80 and 81 receives the data register ZERO and ONE outputs, respectively, for the 2 bit plane of the memory array 21. Likewise, the inhibit circuit for the 2 bit plane is connected in the output of gate 80 and a coil 83 having equivalent impedance characteristics is connected in the output of gate 81.

The loop circuit inputs for each pair of gates, such as gates 78 and 79, are connected in multiple to the loop circuit path 74. Such multiple input connection is advantageously made to either a terminal of a transformer secondary winding or the output of another gate pair. Thus, the gates 78 and 79 have their inputs connected to transformer 69. The outputs of gates 78 and 79 are connected through the 1 inhibit circuit and the equivalent impedance coil 82, respectively, to a common terminal 84 in loop circuit 74. Terminal 84 is in the multiplied inputs of the gates 80 and 81. The remaining terminal of the secondary winding of transformer 69 is connected to ground. Likewise the remote terminals of the $k$ bit plane inhibit circuit and its corresponding impedance 86 are connected together at a terminal 85 which is also connected to ground to complete the loop circuit 74.

Although two pairs of gates are shown in the group 30*a* between the transformers 69 and 70, more or fewer gate pairs may be employed advantageously as required. Since the data register output for any particular bit plane of the memory array must be either a ONE or a ZERO, only one gate of any gate pair in FIG. 6 can be enabled at any one time. Consequently, the data coupled from data register 31 to the bit control gates determines whether the current loop path 74 will be completed through the inhibit circuit of such bit plane or through the equivalent impedance coil corresponding to that same plane.

Figure 6A:
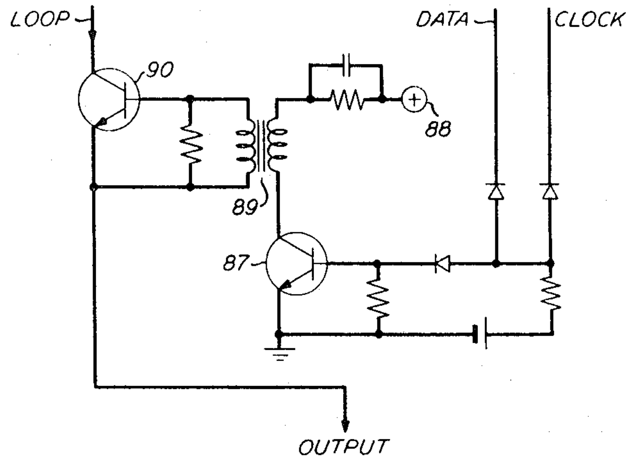

In FIG. 6A there is illustrated a schematic circuit diagram of a typical AND gate of the type advantageously employed in the circuit of FIG. 6. The loop circuit, data, and clock input connections are indicated. The data and clock inputs control a conventional resistor-diode logic combination for in turn controlling conduction of current through a transistor 87 from a source 88. A transformer 89 has its primary winding connected in series with the collector-emitter path of transistor 87 so that current variations are coupled through the transformer to the base emitter junction of a second transistor 90 which has its collector-emitter path connected in series in the closed loop circuit 74.

Figure 6B:
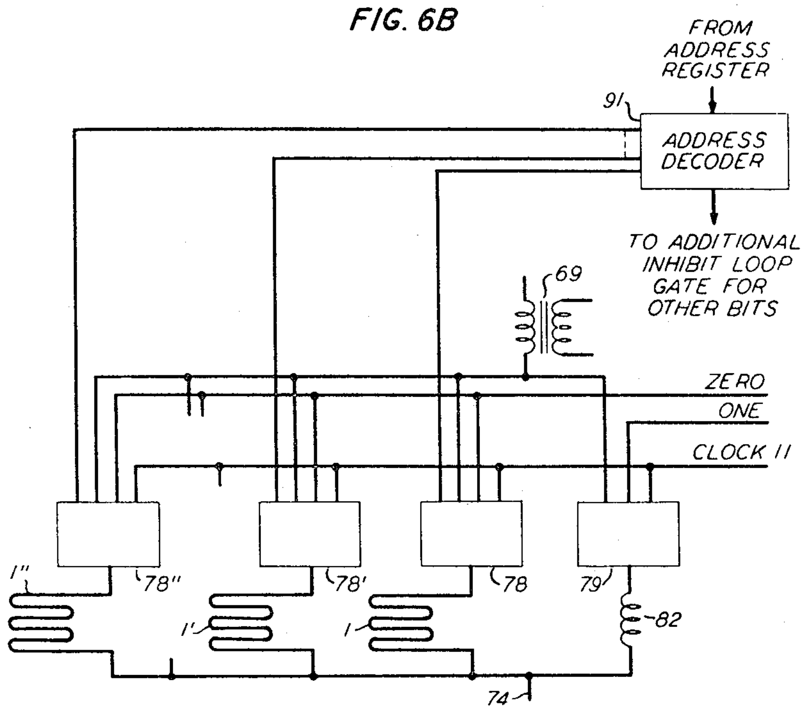
FIG. 6B is a partial diagram illustrating a modification of the bit control gate arrangement of FIG. 6.

The inhibit driver and bit control gate arrangement of FIGS. 5 and 6 has an additional feature which is unique to the type of arrangement illustrated. Usually if it is desired to enlarge the capacity of a memory it is necessary to enlarge also the inhibit driver capacity for supplying energy to the various inhibit circuits. However, the arrangement of FIGS. 5 and 6 may be readily expanded to handle increased memory capacity without increasing the size of the inhibit driver, and without altering the single inhibit optimization adjustment, in a manner which is indicated by the partial schematic diagram shown in FIG. 6B. Here the original pair of control gates 78 and 79 is supplemented by two additional gates 78′ and 78″ which are connected to additional sections of the inhibit circuit for the 1 bit plane. All of the gates have input connections from clock source 11 and from the transformer 69. The gate 79 has the same input connection from the ONE output for the 1 bit plane from the data register 31. The ZERO output from the data register for the 1 bit plane is applied to gate 78 as before and is also applied to the gate 78′ and 78″. In order to determine which section of the 1 bit plane inhibit circuit should be connected in the inhibit closed loop circuit 74, each of the gates 78, 78′ and 78″ has an individual input connection from an address decoder 91 which is actuated by the address register 20 in FIG. 1. The decoder 91 operates in much the same fashion as the address translators 18 and 19 in FIG. 1, and also has additional similar output connections to other gate groups for the remaining bit planes of the array, in the same fashion as is illustrated in FIG. 6B for the gates there shown.

Figure 8:
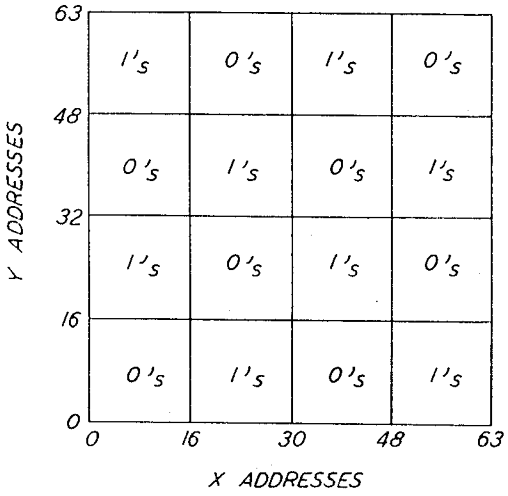
FIG. 8 is an information storage map for a worst noise pattern advantageously employed in the $k+1$ plane in FIG. 7.
Figure 7:
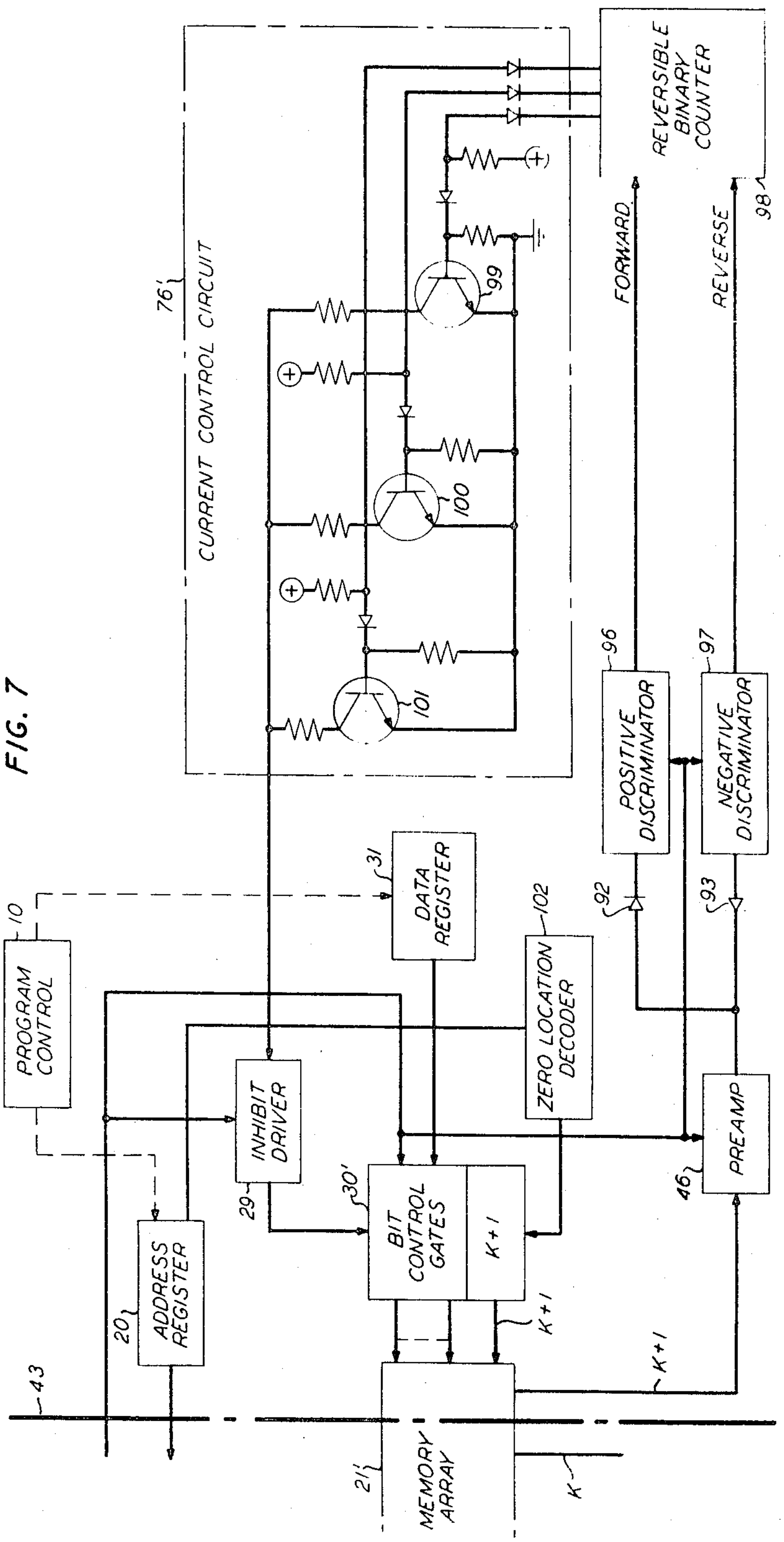
FIG. 7 is a further block and line diagram, including a portion of the diagram of FIG. 1, and illustrating additional apparatus that is utilized to carry out automatically the method steps of the present invention.

In FIG. 7 there are shown additional apparatus arrangements which may be utilized in conjunction with the apparatus shown in FIG. 1 to the left of the dividing line 43. This additional apparatus is utilized in conjunction with an additional digit plane in memory array 21′ in order to provide automatic servo controlled optimization of the drive current in the memory system. The additional digit plane is considered to be the $k+1$ plane and additional associated circuits are similarly designated. The $k+1$ plane has stored therein a predetermined pattern of binary ONE and ZERO data bits, as is illustrated in FIG. 8, for a 64×64-word memory array. This pattern is advantageously designed to correspond to a worst noise pattern for the memory. Thus, considering a digit plane in which the sensing circuit links half of the memory locations in a positive sense and half in a negative sense to facilitate noise cancellation, as is known in the art, the pattern of FIG. 8 is arranged so that all positive holes are storing ONES and all negative holes are storing ZEROS. The purpose of the $k+1$ digit plane is to provide during each read-out operation a noise reference. The reference selected is the worst possible noise, and the circuits of FIG. 7 are arranged in accordance with the invention to adjust the output current magnitude of the inhibit driver 29 to minimize the noise sensed in the $k+1$ memory plane. It should be apparent that, if the drive current is optimized to minimize the worst noise situation in the $k+1$ reference plane, the noise simultaneously generated in the other $k$ information bit planes of the memory will also be minimized at the same time.

The $k+1$ plane has associated with it in FIG. 7 a correspondingly designated inhibit input lead from a $k+1$ gate in control gates 30′, and a correspondingly designated output sensing circuit. The $k+1$ sensing circuit is coupled to the input of a noise preamplifier circuit 46 which is advantageously the same type as one of the data sensing preamplifiers 23. The output of the preamplifier 46 is coupled through two oppositely poled diodes 92 and 93 to the inputs of a positive signal discriminator 96 and a negative signal discriminator 97, respectively, which detect the presence of noise pulses in excess of a predetermined magnitude. The preamplifier and discriminators are of the same type as the preamplifiers 23 and discriminators 26 in FIG. 1. In this case, however, the single preamplifier 46 drives the two discriminators 96 and 97 to provide separate responses for positive and negative noise pulses received from the $k+1$ data plane.

Figure 7A:
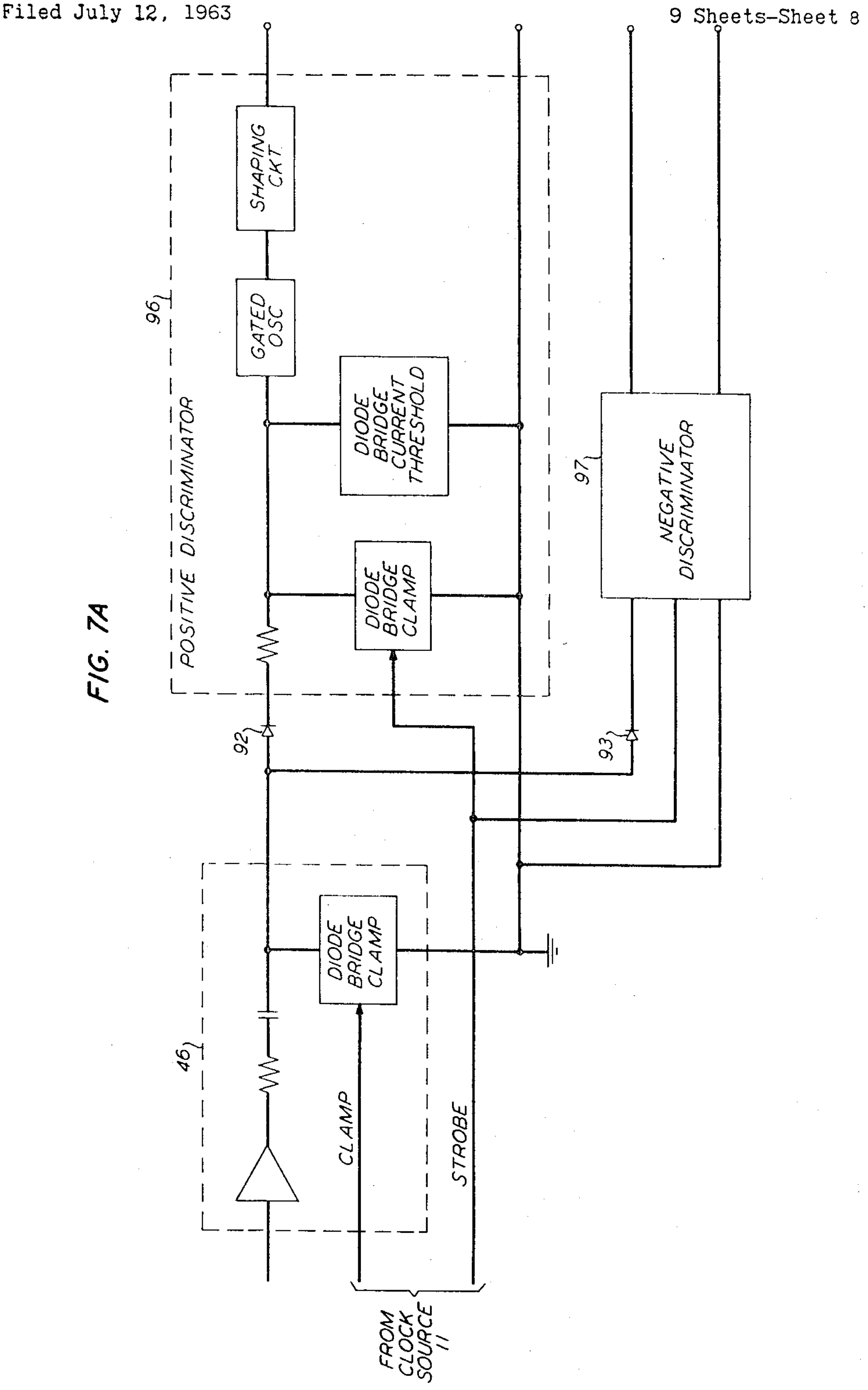
FIG. 7A is a diagram illustrating one type of preamplifier-discriminator circuitry advantageously employed in the arrangement of FIG. 7.

Details of the preamplifier 46 and discriminators associated therewith are shown in FIG. 7A and are described herein to the extent necessary to relate the disclosure of the Genke et al. application Ser. No. 253,227 to the present invention. Clock pulses from the source 11 are supplied to preamplifier 46 to control a shunt clamp which is utilized in the preamplifier for direct current restoration purposes. The clamp is active during the bulk of the memory read-write cycle and is released by the clock pulse just prior to the beginning of the inhibit interval so that the direct current current restored inhibit noise is coupled from the preamplifier to the discriminators 96 and 97 which are essentially identical to one another. Diode 92 directs positive noise to the discriminator 96 and diode 93 directs negative noise to the discriminator 97. Although bridge-type clamp and threshold circuits are indicated in the discriminators, unipolar circuits can also be used in view of the polarity-selecting functions of diodes 92 and 93.

The appropriately phased clock pulse from source 11 is applied to the discriminators in multiple to strobe their input clamps and thereby couple any signal at the discriminator input to the gated oscillator thereof if such a signal is of sufficient magnitude to overcome the clamping effect of the discriminator current threshold circuit. If the signal is of sufficient amplitude the gated oscillator produces a pulse which is shaped and thereafter appears at the discriminator output terminals. The details of this type of discriminator operation are disclosed in the aforementioned Genke et al. application Ser. No. 253,227.

The output of discriminator 96 is in FIG. 7 applied to the forward drive input of a reversible binary counter 98 and the output of discriminator 97 is applied to the reverse drive input of the same counter. Thus, each noise output pulse from one of the discriminators causes counter 98 to be driven in either the forward counting or reverse counting mode in a manner well known in the art. Three output connections from different stages of the counter are coupled to a current control circuit 76' for adjusting the output current of the inhibit driver 29. The circuit 76' is substituted for, and performs the same function in the inhibit driver 29 as did, the variable resistor 76 which was previously described in connection with the driver in FIG. 5. Each of the counter output connections is coupled through a separate threshold logic circuit to the base electrode of a different one of the transistors 99, 100, and 101 to control conduction of those transistors in different permutations and combinations, thereby changing the effective resistance shunting the resistor 77 in FIG. 5.

The manner of operation of the aforementioned type of binary counter and current control circuit to alter the output magnitude of a drive pulse generator is fully described in my United States Patent No. 3,299,278 which issued Jan. 17, 1967. Briefly, however, counter 98 provides binary weighted outputs arranged to increase inhibit current when counting forward in response to positive noise as indicated in FIG. 3C. Similarly, inhibit current is reduced when counting in reverse in response to negative noise. Read current may be controlled in the same manner, as indicated in FIG. 3A; but the counter inputs must be reversed to control write current as indicated in FIG. 3B.

The $k+1$ plane in the memory array 21' is an ordinary digit plane in the memory in all respects except that it has stored therein a combination of binary ONE and ZERO conditions which is predetermined to approximate as closely as possible a noise-generating information bit pattern which would produce the maximum noise possible in the sensing circuit. This is commonly called the worst noise pattern. The exact format of the pattern will be unique to each memory wiring plan. One plan is indicated schematically in FIG. 9.

Each memory location in the $k+1$ digit plane is linked by the X and Y drive circuits in the array 21' in exactly the same manner as those circuits link the corresponding locations in all of the other digit planes of the memory array. However, the inhibit circuit connection to the $k+1$ plane is controlled by a separate bit control gate $k+1$ in the gates 30' that is not operated by the data register 31.

During the read-out operation of the memory system the noise pattern bit which is selected in the $k+1$ bit plane of memory array 21', along with information bits of a corresponding selected word, is erased in the same fashion as the corresponding selected bits of the word that is selected for read-out to the data signal preamplifiers 23 in FIG. 1. Insofar as the 0 through $k$ bits of the selected word are concerned, they are replaced by a new word during the write-in interval of the memory. But it is necessary in the $k+1$ plane, which stores the reference noise pattern, to write back exactly the same bit in accordance with the pattern of FIG. 8 which had just been read out to the preamplifier 46.

For the purpose of restoring the bit pattern in the $k+1$ plane, pattern address decoding logic is provided for recognizing from the output of address register 20 the addresses corresponding to the noise reference pattern and controlling the $k+1$ gate of the bit control gates 30' accordingly. In the embodiment of FIG. 7 this address recognizing logic takes the form of a ZERO location decoder 102 which receives the output of address register 20. Decoder 102 actuates the $k+1$ bit control gate to couple inhibit driver 29 to the $k+1$ plane of memory array 21' each time that the address of a ZERO in the pattern of FIG. 8 is recognized. Details of the decoder 102 and the arrangement of the $k+1$ bit control gate are shown in FIG. 9.

Figure 9:
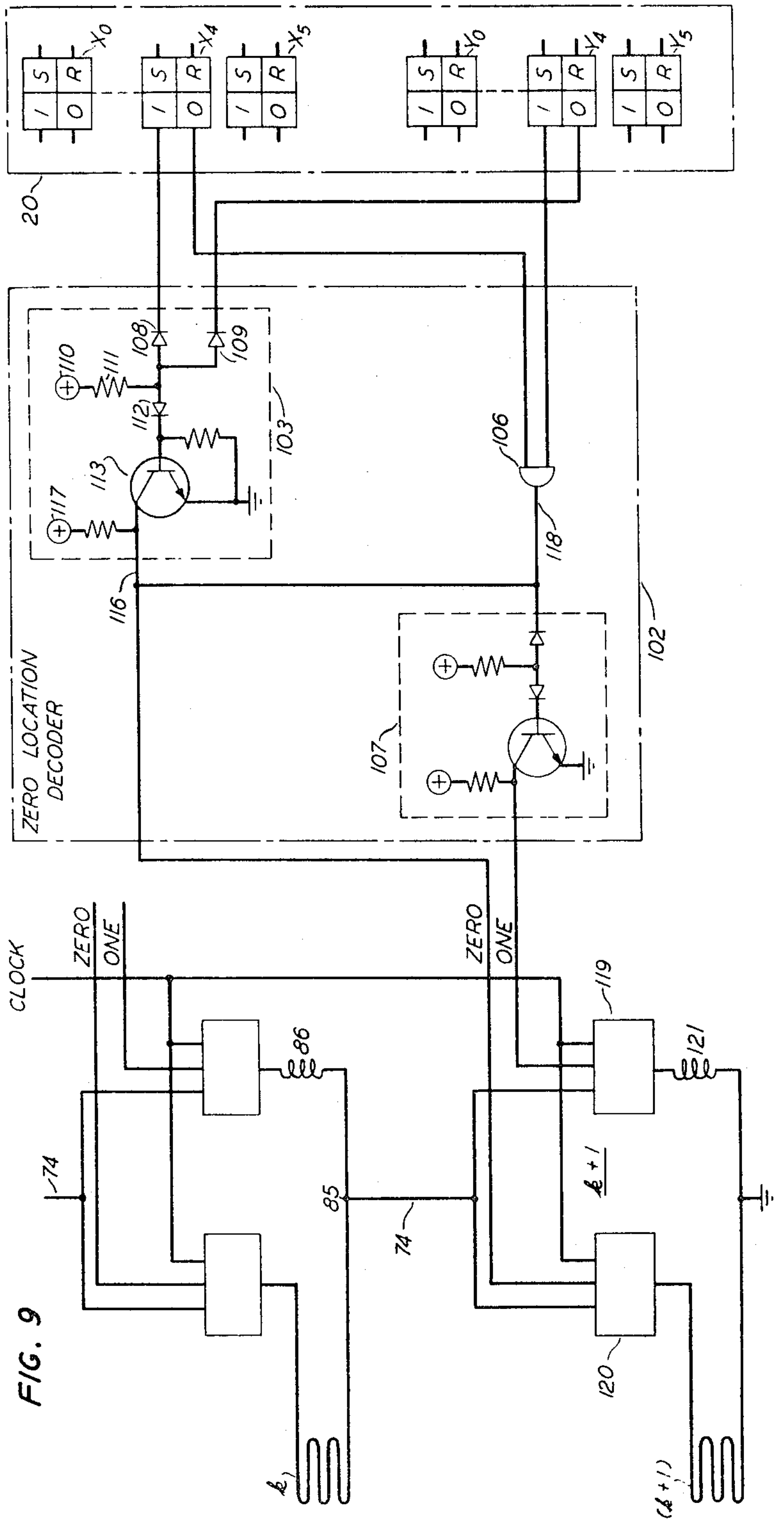
FIG. 9 is a diagram of a ZERO location decoder used in the arrangement of FIG. 7.

In FIG. 9 the relevant portions of address register 20 are shown. A plurality of bistable circuits are included in register 20 and each is schematically indicated in a conventional manner with set and reset input connections thereto designated S and R, respectively, and with corresponding ONE and ZERO output connections also indicated. A first group of the bistable circuits, $X_0$ through $X_5$ register the binary designations of the 64 X addresses in the pattern of FIG. 8. A second group of the bistable circuits, $Y_0$ through $Y_5$, register the binary representations of the 64 Y addresses in the reference noise pattern of FIG. 8. Assuming that the $X_0$ and $Y_0$ circuits register binary digits of least significance for the X and Y addresses, respectively, all of the ZERO addresses in the pattern of FIG. 8 can be recognized by the decoder 102 as a function of output signals from the ONE and ZERO output connections of the $X_4$ and $Y_4$ bistable circuits in address register 20.

The decoder 102 includes two AND gates 103 and 106, as well as an inverting gate 107. Gate 103 receives at its two input connections the ONE output of bistable circuit $X_4$ and the ZERO output of bistable circuit $Y_4$. AND gate 106 receives the ZERO output of bistable circuit $X_4$ and the ONE output of bistable circuit $Y_4$. Each of the gates 103 and 106 includes resistor-diode coincidence logic coupled to the input connection thereof for controlling a transistor switch at the output connection thereof. Thus, with respect to the gate 103, a positive ONE output from bistable circuit $X_4$ and a posiive ZERO output from the bistable circuit $Y_4$ are simultaneously required in order to disable the two input diodes 108 and 109. This disabling action permits current to flow from a positive source 110 through a resistor 111 and a diode 112 to the base electrode of a transistor 113 which performs the switching function. When current is supplied to the base electrode of transistor 113 it is driven into conduction to clamp the output lead 116 of the gate 103 at ground. In the absence of conduction in transistor 113 the lead 116 is held at a positive potential supplied by a source 117. This latter condition prevails whenever a ground output signal is supplied to at least one of the diodes 108 or 109 by its corresponding bistable circuit in address register 20. Each bistable circuit comprises two cross-coupled AND gates of the same type as gate 103. AND gate 106 is constructed essentially the same as gate 103 and responds in a similar fashion to produce either positive or ground signals at its output lead 118.

Both of the AND gates 103 and 106 are disabled when the bistable circuits $X_4$ and $Y_4$ are in the same stable condition representing addresses of ZERO bits in FIG. 8. Leads 116 and 118 are both positive, and the decoder ZERO output lead is positive and enables an AND gate 120 in bit control gate $k+1$. The positive signal on leads 116 and 118 is inverted by a gate 107 which is similar to the AND gates just described except that it includes only a single input connection. The ground output of gate 107 is applied on the ONE lead from the ZERO location decoder 102 for disabling a gate 119 in the $k+1$ bit control gate. If either of the gates 103 and 106 is enabled, its ground output clamps both the decoder ZERO lead and the inverted input to ground so that gate 120 is disabled and gate 119 is enabled. Thus, ONE and ZERO output signals from the ZERO location decoder 102 control the $k+1$ gate in the same fashion that the data register 31 output signals control corresponding bit control gates as previously described herein in connection with FIG. 6.

The gates 119 and 120 comprise a bit control gate pair which is the same as other pairs described in FIG. 6 and wherein the $k+1$ bit plane inhibit circuit is connected in series in the output of gate 120, and a coil 121 is connected in the output of gate 119 to represent the equivalent impedance of the $k+1$ inhibit circuit. The $k+1$ bit control gate is inserted in the series closed loop current path 74 between ground and the terminal 85 in the bit control gate circuit for the $k$ bit plane of the memory.

The servo arrangement of FIG. 7 is utilized in magnetic memory systems which have been factory set to the optimum drive current combination. The servo loop of FIG. 7 is adapted to detect any increase in noise which results from drift of one sort or another in one of the current drivers for the memory system. Such drift in any one of the drivers changes the optimum combination for minimum noise. Circuits of FIG. 7 make a continuous check on the system in the manner already described during each read-write cycle in order to determine whether or not such a change in the optimum combination has taken place thereby producing an increase in the noise. If an increase in noise magnitude is detected, the counter 98 operates to increase or decrease the output of the inhibit driver 29 in order to derive a new optimum drive current combination with minimum noise. It is to be understood, of course, that the drive current control illustrated in FIG. 7 can be similarly applied to either of the read or write drive current sources, rather than the inhibit source.

Although the present invention has been described in connection with particular applications and specific embodiments thereof, it is to be understood that additional modifications, embodiments, features, and advantages of the invention which will be apparent to those skilled in the art, and which utilize the underlying principles of the invention, are all included within the spirit and scope of the present invention.

What is claimed is:

1. In a coincident current magnetic memory system wherein binary-coded information bits are stored in a plurality of bistable magentic switching devices, a plurality of drive current sources coupled to said devices for applying coincident curents to activate selected ones of said devices, a group of said devices being set in a predetermined pattern of stable states, said pattern being selected so that one of said coincident currents activates said group to produce a reference noise signal, a sensing circuit coupled to said group of devices to develop noise voltages as a function of said noise signal, means detecting voltages in said sensing circuit, and means connected between said detecting means and one of said drive current sources for adjusting the drive current output amplitude of said one source to reduce the magnitude of said noise signal.

2. In a magnetic memory system comprising a memory module including a plurality of bistable magnetic switching devices, first and second address circuits for applying coincident currents of a first polarity to the module devices defining a word of stored information, inhibit circuits for applying curent of a second polarity to digit planes defined by the corresponding digits of a plurality of stored words, a first curent pulse generator having its output coupled to said first address circuits, a second curent pulse generator having its output coupled to said second address circuits, an inhibit current pulse generator having its output coupled to said inhibit circuits, one digit plane of the memory including devices coupled to said first and second address circuits and wherein a predetermined pattern of bistable conditions is established, a sensing circuit coupled to the devices of said one digit plane for receiving induced voltages in response to switching of such devices, means detecting voltages in said sensing circuit, and means coupling said detecting means to adjust the output magnitude of only one of said currents pulse generators to reduce the magnitude of said noise signal to a minimum level.

3. In a word-oriented magnetic memory in which each stored word comprises a plurality of digits, a sensing circuit is provided for each digit plane of the memory, drive circuits are provided to supply operating pulses to each orthogonal coordinate of the memory, and current pulse generating means are coupled to each of said drive circuits, the improvement which comprises means detecting signals generated in one of said digit planes, and means coupled to the output of said detecting means to adjust the output pulse magnitude of one of said pulse generating means to produce a minimum signal amplitude to said detecting means.

4. A magnetic memory comprising a plurality of bistable magnetic devices having substantially rectangular hysteresis characteristics defining two stable states of magnetic flux remanence, which states are useful for representing binary coded information, a first group of said devices having words of binary coded information stored at predetermined addresses therein and being adapted to receive drive signals for interrogating selected ones of such devices to read out a stored word during a read-out time interval and for writing a word in such selected devices during a write-in time interval, a second group of said devices also receiving said drive signals and having a predetermined pattern of binary signals stored therein for generating a theoretical worst noise signal during the read-out interval of said memory, each device in said second group having an address corresponding to the address of a different one of the adresses of said first groups of devices, servo circuit means responsive to said noise signal of said second group of devices for adjusting the amplitude of one of said drive signals to minimize the magnitude of said noise signal, means storing the address of a word in said first group selected for read-out during said read-out interval, and means responsive to said stored address writing back in said second group of devices the binary information corresponding to the address of said selected devices in accordance with said pattern.

5. The magnetic memory in accordance with claim 4 in which said binary signals comprise binary ONE and ZERO bits, and said writing back means comprises a ZERO address decoder coupled to said address storing means for producing an output signal in response to an address corresponding to the location of a ZERO in said pattern and means coupling said output signal to the devices of said second group.

6. The method for optimizing the magnitude of interrogation drive currents in a magnetic memory system having read, write, and inhibit drive currents, said method comprising the steps of adjusting said inhibit current for minimum noise in a sensing circuit of said memory, measuring the signal-to-noise ratio in a sensing circuit, repeat the adjusting and measuring steps for different values of said read current holding said write current constant, until a maximum signal-to-noise ratio is determined in said sensing circuit, utilizing each of said different values of read current, repeat said adjusting and measuring steps for different values of said write current until a maximum signal-to-noise ratio is determined, and setting said read, write, and inhibit currents to magnitudes corresponding to the largest signal-to-noise ratio obtained in all of the previously mentioned steps.

7. The method for optimizing drive current magnitudes in a magnetic memory system which includes first, second, and third drive circuits coupled to a corresponding plurality of drive current generators for receiving drive signals to operate said memory in a predetermined read-write cycle to store information in, and read stored information from, selectable locations of said memory, said method comprising the steps of determining the amount of noise in a sensing circuit of said memory at a predetermined time in the read-write cycle thereof, and adjusting the output curent magnitude of one of said current generators to obtain a minimum noise level in said sensing circuit.

8. The method for optimizing drive current magnitudes in a magnetic memory system which includes first, second, and third drive circuits coupled to a corresponding plurality of drive current generators for receiving drive signals to operate said memory in a predetermined read-write cycle to store information in, and read stored information from, selectable locations of said memory, said method comprising the steps of determining the amount of noise in a sensing circuit of said memory at a predetermined time in the read-write cycle thereof, and adjusting the output current magnitude of at least one of said current generators to obtain a maximum signal-to-noise ratio in said sensing circuit.

9. In a magnetic memory in which each of a plurality of stored words comprises a plurality of digits, a sensing circuit is provided for each digit plane of the memory, drive circuits are provided for each orthogonal coordinate of the memory, and pulse generating means are coupled to each of said drive circuits, the improvement which comprises means detecting in one of said digit planes signals generated in excess of a predetermined magnitude, one of said drive circuits includes portions coupled to a plurality of said digit planes, each of which portions supplies signals from the same one of said generating means to its corresponding digit plane, said one generating means includes a plurality of output coupling means, said coupling means being interspersed with said digit plane circuit portions in a closed loop current path so that the total potential differences across the digit plane circuits between any two successive ones of said coupling means in said path is approximately equal to the output potential developed by one of said coupling means, and means coupling the output of said detecting means to adjust the output pulse magnitude of said one pulse generating means to produce a minimum signal amplitude in said detecting means.

10. In a magnetic memory in which each stored word comprises a plurality of digits, a sensing circuit is provided for each digit plane of the memory, drive circuits are provided for each orthogonal coordinate of the memory, and pulse generating means are coupled to each of said drive circuits, the improvement which comprises means detecting signals generated in one of said digit planes, one of said drive circuits including a plurality of digit plane circuits each of which supplies signals from one of said generating means to a different one of said digit planes, said one generating means including a plurality of output coupling means, said coupling means being interspersed with said digit plane circuits in a closed loop current path, and means coupled to the output of said detecting means adjusting the output pulse magnitude of said one generating means to minimize the signal output of said detecting means.

11. In a magnetic memory in which each stored word comprises a plurality of digits, a sensing circuit is provided for each digit plane of the memory, drive circuits are provided for each orthogonal coordinate of the memory, and pulse generating means are coupled to each of said drive circuits for actuating said memory during read-out and write-in intervals in the read-write cycle thereof, the improvement which comprises means controlling the output pulse magnitude of one of said generating means, and means actuating said controlling means in response to signals in one of said sensing circuits.

12. In a magnetic memory in which each stored word comprises a plurality of digits, a sensing circuit is provided for each digit plane of the memory, drive circuits are provided for each orthogonal coordinate of the memory, and pulse generating means are coupled to each of said drive circuits for actuating said memory during read-out and write-in intervals in the read-wirte cycle, thereof, the improvement which comprises means controlling the output pulse magnitude of one of said generating means, means actuating said controlling means in response to signals in one of said sensing circuits, means in said one sensing circuit for coupling signals in such sensing circuit to said actuating means during only a predetermined portion of the write-in interval of the memory, and means in the remainder of said sensing circuits for deriving an output therefrom during onl ya predetermined portion of the read-out interval of said memory.

13. In a magnetic memory having a plurality of sensing circuits linking different memory regions to produce electric signals corresponding to changes in information storage conditions in their respective regions, and a corresponding plurality of drive circuits each linking a different one of said regions, a drive pulse generator, electric connections interconnecting said drive circuits in a closed series loop circuit, and a plurality of drive pulse coupling means each independent of said information storage conditions and coupling the output of said generator to a different portion of said said loop circuit.

14. In an electric circuit having a plurality of load devices, different selectable proportions of which devices are to be simultaneously energized.

drive circuits for supplying electric energy to said portions, a drive circuit energizing source having a plurality of output connections, and means electrically interconnecting said drive circuits and said output connections in interleaved sequence in a closed loop circuit path for injecting portions of output from said source in series in said loop circuit path at different points around said path.

15. In the electric circuit of claim 14 a plurality of bypass impedances each having an impedance of substantially the same magnitude and characteristic as a different corresponding one of said drive circuits, and gating means operable to substitute for any one or more of said drive circuits in said closed loop current path, their corresponding bypass impedances.

16. In a magnetic memory having plural data storage locations each of which has a predetermined binary coded address designation, plural groups of memory devices, each of said groups being divided into plural subgroups, each of said subgroups having an electric circuit linking the devices thereof, all of said linking circuits of a group having substantially the same impedance characteristics, a separate circuit gate connected in series with each of said circuits and having said circuit arranged in the output of the gate, each of said groups having associated therewith an impeding circuit having substantially the same impedance characteristics as a circuit of a corresponding subgroup thereof, an impeding element gate having such impeding element connected in series with the output thereof, data signal receiving means coupled to said gates so that in each of said groups one of said element or circuit gates is enabled by said data signal, means in each of said groups connecting said circuit gates and said element gate and their corresponding respective outputs in parallel with one another, a pulse generator, means connecting all of said parallel circuits in series with one another in a single closed loop circuit, and means coupling the output of said generator to said loop.

17. In a magnetic memory having a plurality of data storage locations each of which locations has a predetermined address designation, plural groups of memory devices, each of said groups being divided into plural subgroups and each of said subgroups having an electric circuit linking the devices thereof, each of said groups having associated therewith an impeding circuit element having substantially the same impedance characteristics as one of said circuits, gating means operable for enabling in each of said groups either said impeding element or one only of said circuits thereof, a pulse generator, means including a portion of said gating means connecting all of the enabled circuits and impeding elements in a single series closed loop circuit, and means coupling the output of said generator to said loop.

18. In a magnetic memory having a plurality of magnetic storage devices arranged in a three dimensional array wherein device locations are defined by three orthogonal coordinates, plural drive circuits coupled to said devices along said coordinates, respectively, three drive current sources each supplying drive current along a different one of said coordinate drive circuits to energize the devices coupled thereto, a sensing circuit linking a predetermined group of said devices in common with one of said drive circuits, means indicating noise level in said sensing circuit, and means in at least one of said drive current sources for adjusting the magnitude of the output current therefrom.

19. In a magnetic memory having a plurality of bistable magnetic storage devices displaying substantially rectangular hysteresis characteristics defining two remanent flux density ranges of opposite polarity for storing binary ONE and ZERO bits, respectively, said devices having plural remanent flux density levels in each of said stable ranges and being further characterized in that the application of a magnetomotive force of a first predetermined intensity and polarity to a device switches that device to a state corresponding to such polarity but the application of a force of lesser intensity switches a portion of the flux in the device to change the flux density level without switching the state of such device, each device generating a noise signal of different magnitude at each of said levels within a s'able range thereof in response to said force of lesser intensity, means applying drive currents in predetermined combinations to actuate selected ones of said devices in a memory read-write cycle, said applying means including means for predisturbing said selected devices to substantially predetermined flux density levels for binary ONE and ZERO bits, respectively, and means adjusting the magnitude of at least one of said drive currents to magnetically bias said selected devices from said predetermined levels so that noise generated by device stored binary ONE and ZERO signals are substantially equal in magnitude to one another.

References Cited

UNITED STATES PATENTS

| | | | |
|---|---|---|---|
| 3,144,641 | 8/1964 | Raffel | 340—174 |
| 3,208,053 | 9/1965 | Elovic | 340—174 |
| 3,243,787 | 3/1966 | Habib | 340—174 |
| 3,278,915 | 10/1966 | Joseph | 340—174 |
| 3,281,802 | 10/1966 | McMahon | 340—174 |

OTHER REFERENCES

P. Cooke and D. C. Dillistone: "The Measurement and Reduction of Noise in Coincident-Current Core Memories"; The Institution of Electrical Engineers, Paper No. 3957M, September 1962, pp. 383–389.

JAMES W. MOFFITT, Primary Examiner